US010551932B2

(12) United States Patent
Ito

(10) Patent No.: US 10,551,932 B2
(45) Date of Patent: *Feb. 4, 2020

(54) WEARABLE DEVICE, CONTROL METHOD, AND CONTROL PROGRAM

(71) Applicant: KYOCERA Corporation, Kyoto-shi, Kyoto (JP)

(72) Inventor: Shingo Ito, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/748,121

(22) PCT Filed: Jul. 25, 2016

(86) PCT No.: PCT/JP2016/071767
§ 371 (c)(1),
(2) Date: Jan. 26, 2018

(87) PCT Pub. No.: WO2017/018388
PCT Pub. Date: Feb. 2, 2017

(65) Prior Publication Data
US 2018/0217672 A1 Aug. 2, 2018

(30) Foreign Application Priority Data
Jul. 29, 2015 (JP) .................. 2015-149243

(51) Int. Cl.
*G06F 3/01* (2006.01)
*G02B 27/01* (2006.01)
*G06F 3/03* (2006.01)

(52) U.S. Cl.
CPC ......... *G06F 3/017* (2013.01); *G02B 27/0172* (2013.01); *G06F 3/0304* (2013.01);
(Continued)

(58) Field of Classification Search
CPC ........ G02B 27/0172; G02B 2027/0134; G02B 2027/0138; G02B 2027/014;
(Continued)

(56) References Cited

U.S. PATENT DOCUMENTS 8,854,433 B1 10/2014 Rafii
9,207,864 B2 12/2015 Funabashi et al.
(Continued)

FOREIGN PATENT DOCUMENTS

JP 7-5978 A 1/1995
JP H075978 B2 * 1/1995 ............... C21D 9/14
(Continued)

OTHER PUBLICATIONS

English translation of JPH075978 (Year: 1995).*
(Continued)

*Primary Examiner* — Nelson M Rosario
(74) *Attorney, Agent, or Firm* — Hauptman Ham, LLP

(57) ABSTRACT

A wearable device according to an example of embodiments includes a display unit configured to display characters, a detector configured to detect a user's upper limb existing in a real space, and a controller. When a first body motion of allowing one part and the other part of the upper limb to approach each other is detected from a detection result of the detector, the controller executes a character selection process of selecting the characters. The wearable device is attachable to the head.

9 Claims, 12 Drawing Sheets

(52) U.S. Cl.
CPC .............. *G02B 2027/014* (2013.01); *G02B 2027/0138* (2013.01); *G02B 2027/0178* (2013.01)

(58) Field of Classification Search
CPC .......... G02B 2027/0178; G02B 27/017; G02B 2027/0187; G06F 3/01; G06F 3/017; G06F 3/0304; G06F 3/011; G06F 3/0482; G06F 3/04842
See application file for complete search history.

(56) References Cited

U.S. PATENT DOCUMENTS

| | | | |
|---|---|---|---|
| 9,696,868 B2 | 7/2017 | Bakhash | |
| 2009/0103780 A1 | 4/2009 | Nishihara et al. | |
| 2012/0327003 A1* | 12/2012 | Matsumura | G06F 3/04883 345/173 |
| 2013/0265596 A1 | 10/2013 | Fujimoto | |
| 2014/0028567 A1* | 1/2014 | Park | G06F 3/005 345/168 |
| 2015/0378582 A1 | 12/2015 | Paraschivescu | |
| 2016/0034039 A1* | 2/2016 | Maeda | G06F 3/011 715/810 |
| 2016/0098094 A1* | 4/2016 | Minkkinen | G06F 3/017 345/156 |
| 2016/0109957 A1 | 4/2016 | Takashima | |
| 2018/0129288 A1* | 5/2018 | Hagiwara | G06F 3/01 |

FOREIGN PATENT DOCUMENTS

| | | |
|---|---|---|
| JP | 2002-304256 A | 10/2002 |
| JP | 2013-218521 A | 10/2013 |
| WO | 2011/118096 A1 | 9/2011 |
| WO | 2014/128751 A1 | 8/2014 |
| WO | 2014/181380 A1 | 11/2014 |

OTHER PUBLICATIONS

ISR for PCT/JP2016/071767 mailed Oct. 4, 2016, 4 pp.
International Search Report in PCT Application No. PCT/JP2016/071936, dated Aug. 30, 2016, 4pp.

* cited by examiner

WEARABLE DEVICE, CONTROL METHOD, AND CONTROL PROGRAM

CROSS-REFERENCE TO RELATED APPLICATION(S)

The present application is a national phase of International Application No. PCT/JP2016/071767 filed Jul. 25, 2016 and claims priority to Japanese Patent Application No. 2015-149243, filed on Jul. 29, 2015.

FIELD

The present application relates to a wearable device attachable to a user's head, a control method, and a control program.

BACKGROUND

In recent years, as a wearable device described above, a head mounted display device including a display arranged in front of eyes and an infrared detection unit capable of recognizing movement of fingers and performing operations according to hand gestures is.

SUMMARY

A wearable device attachable to a head according to one embodiment includes a display unit configured to display characters, a detector configured to detect a user's upper limb existing in a real space, and a controller configured to execute a character selection process of selecting the characters when a first body motion of allowing one part and the other part of the upper limb to approach each other is detected from a detection result of the detector.

Further, a wearable device being attachable to a head according to one embodiment includes a display unit configured to display characters, a detector configured to detect a user's upper limb existing in a real space, and a controller configured to execute a character type changing process of changing a character type of the characters when a body motion accompanying a change in a distance between one part and the other part of the upper limb is detected from a detection result of the detector.

Further, a wearable device being attachable to a user's head according to one embodiment includes a display unit configured to be arranged in front of user's eyes and display characters, a detector configured to detect a user's upper limb existing in a real space, and a controller configured to detect a body motion of the upper limb from a detection result of the detector. At the time of displaying a character input screen by the display unit, when a character string input before the time of displaying is displayed, the controller is configured to determine whether or not a predetermined body motion is detected among the body motions, and if it is determined that the predetermined body motion is detected, the wearable device is configured to erase the display of the character string.

A wearable device being attachable to a head according to one embodiment includes a display unit configured to display character string configured with a plurality of characters, a detector configured to detect a user's upper limb existing in a real space, and a controller configured to execute a character selection process of selecting a first character string included in a range defined by a position of one part and a position of the other part of the upper limb detected by the detector in the character string. The controller is configured to execute a predetermined process on the first character string based on the fact that a predetermined body motion of the upper limb has been detected in the state where a distance between the one part and the other part is maintained substantially the same during execution of the character selection process.

A control method according to one embodiment executed by a wearable device that is attachable to a head and includes a display unit configured to display characters, a detector configured to detect a user's upper limb existing in a real space, and a controller. When a first body motion of allowing one part and the other part of the upper limb to approach each other is detected from a detection result of the detector, the controller is configured to execute a character selection process of selecting the characters.

A control program according to one embodiment, in a wearable device that is attachable to a head and includes a display unit configured to display characters, a detector configured to detect a user's upper limb existing in a real space, and a controller. When a first body motion of allowing one part and the other part of the upper limb to approach each other is detected from a detection result of the detector, the control program causes the controller to execute a character selection process of selecting the characters.

DETAILED DESCRIPTION

Figure 1:
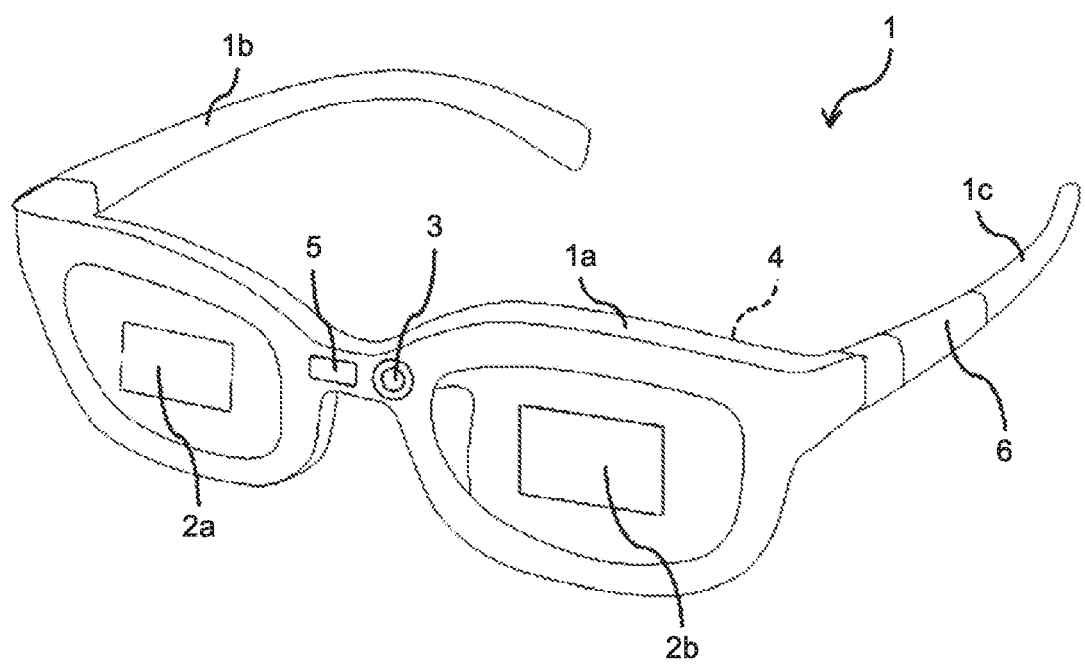
FIG. 1 is a perspective view of a wearable device.

A plurality of embodiments for implementing a wearable device 1 according to the present application will be described in detail with reference to the drawings. In the following description, in some cases, the same components are denoted by the same reference numerals. In addition, redundant description may be omitted. The present application is not limited by the following description. Components in the following description include those that can be easily assumed by those skilled in the art, substantially the same ones, and so-called equivalents. In the wearable device as described above, it may be preferable that the wearable device is more conveniently used by the user. An object of the present application may be to provide a wearable device that is more conveniently used by a user, a control method, and a control program.

First of all, the overall configuration of the wearable device 1 will be described with reference to FIG. 1. FIG. 1 is a perspective view of the wearable device 1. As illustrated in FIG. 1, the wearable device 1 is a head mounted type (or eyeglass type) device which is attached to the user's head.

The wearable device 1 includes a front portion 1a, a side portion 1b, and a side portion 1c. The front portion 1a is arranged on the front surface of a user so as to cover both user's eyes when the wearable device is attached to the user. The side portion 1b is connected to one end of the front portion 1a. The side portion 1c is connected to the other end of the front portion 1a. The side portion 1b and the side portion 1c are supported by user's ears like temples of eyeglasses when the wearable device is attached to the user and stabilize the wearable device 1. The side portion 1b and the side portion 1c may be configured to be connected at the back surface of the user's head when the wearable device is attached to the user.

The front portion 1a has a display unit 2a and a display unit 2b on the surface facing the user's eyes when the wearable device is attached to the user. The display unit 2a is disposed at a position facing the user's right eye when the wearable device is attached to the user. The display unit 2b is disposed at a position facing the user's left eye when the wearable device is attached to the user. The display unit 2a displays an image for the right eye, and the display unit 2b displays an image for the left eye. By providing the display unit 2a and the display unit 2b that display the images corresponding to the user's respective eyes when the wearable device is attached to the user, the wearable device 1 can realize three-dimensional display by parallax of both eyes.

The display unit 2a and the display unit 2b are a pair of transmissive or semi-transmissive displays, but the present application is not limited thereto. For example, the display unit 2a and the display unit 2b may be provided with lenses such as eyeglass lenses, sunglass lenses, or ultraviolet cut lenses, and the display unit 2a and the display unit 2b may be provided separately from the lenses. The display unit 2a and the display unit 2b may be configured with one display device as long as different images can be independently provided to the user's right and left eyes.

The front portion 1a is provided with an imager 3 (out-camera). The imager 3 is disposed at a central portion of the front portion 1a. The imager 3 acquires an image in a predetermined range of a scene in front of the user. The imager 3 can also acquire an image in a range corresponding to a user's field of view. The field of view referred to herein is, for example, the field of view when the user is looking at the front. The imager 3 may be configured with two imagers including an imager disposed in the vicinity of the one end (the right eye side when the wearable device is attached to the user) of the front portion 1a and an imager disposed in the vicinity of the other end (the left eye side when the wearable device is attached to the user) of the front portion 1a. In this case, the imager disposed in the vicinity of the one end (the right eye side when the wearable device is attached to the user) of the front portion 1a can acquire the image in the range corresponding to the field of view of the user's right eye. The imager disposed in the vicinity of the one end (the left eye side when the wearable device is attached to the user) of the front portion 1a can acquire an image in a range corresponding to the field of view of the user's left eye.

The front portion 1a is provided with an imager 4 (in-camera). When the wearable device 1 is attached to the user's head, the imager 4 is arranged on the user's face side in the front portion 1a. The imager 4 can acquire the user's face, for example, an eye image.

The front portion 1a is provided with a detector 5. The detector 5 is disposed in the central portion of the front portion 1a. The side portion 1c is provided with an operation part 6. The detector 5 and the operation part 6 will be described later.

The wearable device 1 has a function of allowing the user to visually recognize various kinds of information. When the display unit 2a and the display unit 2b do not perform displaying, the wearable device 1 allows the user to visually recognize the foreground passing through the display unit 2a and the display unit 2b. When the display unit 2a and the display unit 2b perform displaying, the wearable device 1 allows the user to visually recognize the foreground passing through the display unit 2a and the display unit 2b and the display contents of the display unit 2a and the display unit 2b.

Figure 2:
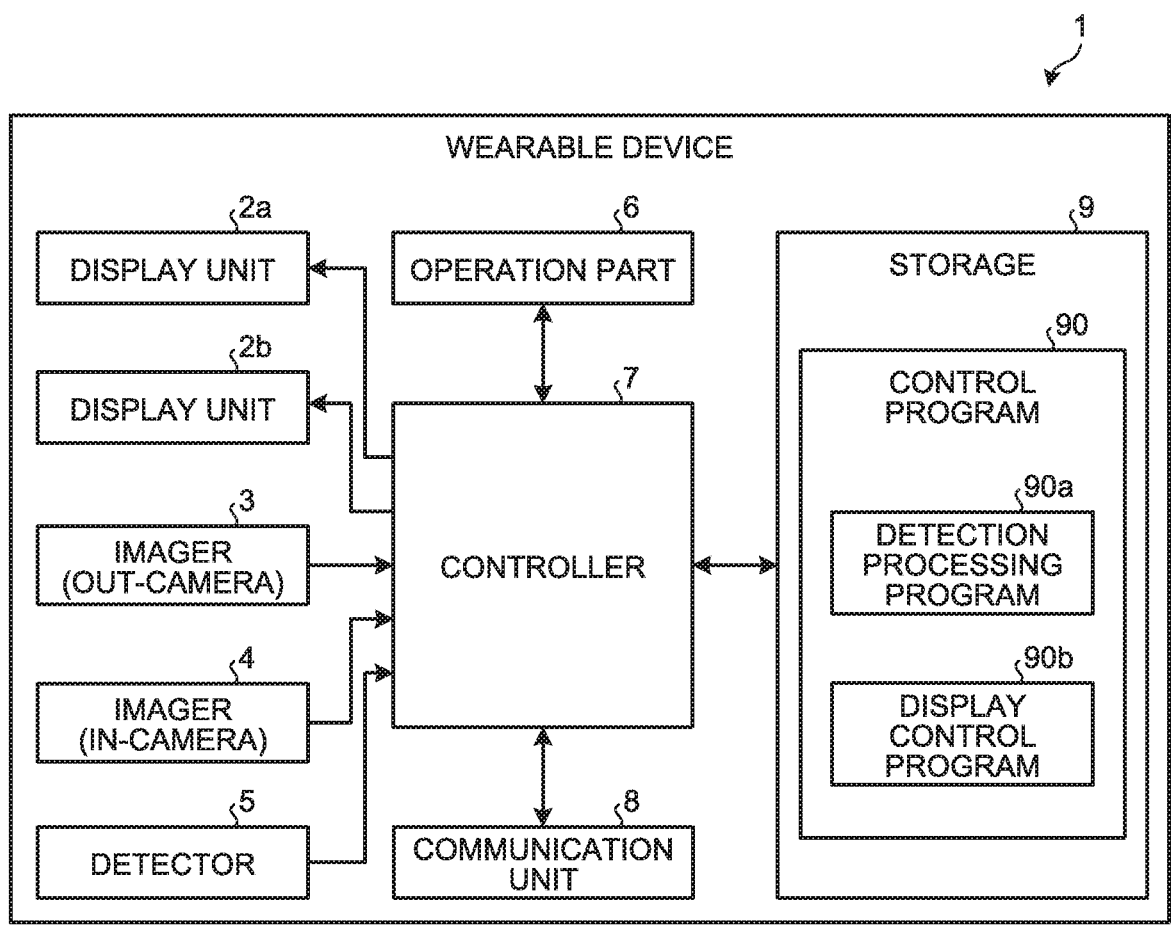
FIG. 2 is a block diagram of a wearable device.

Then, a functional configuration of the wearable device 1 will be described with reference to FIG. 2. FIG. 2 is a block diagram of the wearable device 1. As illustrated in FIG. 2, the wearable device 1 includes a display unit 2a, a display unit 2b, an imager 3 (out-camera), and an imager 4 (in-camera) and preferably further includes a detector 5, an operation part 6, a controller 7, a communication unit 8, and a storage 9.

The display units 2a and 2b include semi-transmissive or transmissive display devices such as a liquid crystal display (LCD) and an organic electro-luminescence (EL) panel. The display unit 2a and the display unit 2b display various kinds of information as images according to control signals input from the controller 7. The display unit 2a and the display unit 2b display predetermined characters under the control of the controller 7. The display unit 2a and the display unit 2b may be a projection device that projects an image onto the user's retina using a light source of a laser beam or the like. In this case, the display unit 2a and the display unit 2b may have a configuration where half mirrors are installed at lens portions of the wearable device 1 emulating eyeglasses and images irradiated from separately installed projectors are projected (in the example illustrated in FIG. 1, the display unit 2a and the display unit 2b illustrate rectangular half mirrors). As described above, the display unit 2a and the display unit 2b may display various kinds of information three-dimensionally. The display unit 2a and the display unit 2b may display various kinds of information as if the various kinds of information existed in front of the user (a position apart from the user). As an example of the method of displaying information in this manner, any one of a frame sequential method, a polarization method, a linear polarization method, a circular polarization method, a top-and-bottom method, a side-by-side method, an anaglyph method, a lenticular method, a parallax barrier method, a liquid crystal parallax barrier method, and a multi-parallax method such as a two-parallax method may be employed.

The imager 3 and the imager 4 electronically capture images using image sensors such as charge coupled device (CCD) image sensors or complementary metal oxide semiconductor (CMOS) image sensors. Then, the imager 3 and the imager 4 convert the captured images into signals and output the signals to the controller 7.

The detector 5 detects a real object (predetermined object) existing in a scene in front of the user. The detector 5 detects, among real objects, for example, a preregistered object or an object matching with a preregistered shape. Examples of the preregistered object include, but are not limited to, a human hand, finger and the like. Examples of the preregistered shape include, but are not limited to, a shape of a human hand, finger and the like. The detector 5 has a sensor that detects the real object. The detector 5 is configured with, for example, an infrared irradiation unit that radiates infrared light and an infrared imager as a sensor capable of receiving infrared light reflected from a predetermined real object. The infrared irradiation unit is provided on the front portion 1a of the wearable device 1, so that the front of the user can be irradiated with the infrared light. The infrared imager is provided on the front portion 1a of the wearable device 1, so that the infrared light reflected from the predetermined object existing in front of the user can be detected. In addition to the infrared light, the detector 5 may detect the real object using at least one of, for example, visible light, ultraviolet light, radio waves, sound waves, magnetism, and electrostatic capacitance.

In embodiments, the imager 3 (out-camera) may also serve as the detector 5. That is, the imager 3 detects an object within the imaging range by analyzing the captured image. The imager 3 is provided on the front portion 1a of the wearable device 1 as illustrated in FIG. 1 so as to be capable of capturing the image of the predetermined object in front of the user.

The operation part 6 includes, for example, a touch sensor disposed on the side portion 1c. The touch sensor is capable of detecting a contact of the user and receives basic operations such as activating, stopping, and operation-mode changing of the wearable device 1 according to the detection result. In embodiments, the operation part 6 is disposed on the side portion 1c, but the present application is not limited thereto. The operation part 6 may be disposed on the side portion 1b or may be disposed on both the side portion 1b and the side portion 1c.

The controller 7 includes a central processing unit (CPU) as computing means and a memory as storage means. The controller 7 realizes various functions by executing programs using these hardware resources. Specifically, the controller 7 reads the programs and data stored in the storage 9, loads the programs and data in the memory, and allows the CPU to execute instructions included in the programs loaded in the memory. The controller 7 reads and writes data from and to the memory and the storage 9 and controls operations of the display unit 2a, the display unit 2b, and the like according to an execution result of the instruction by the CPU. When the CPU executes the instruction, the data loaded in the memory and operations detected through the detector 5 and the like are used as a portion of parameters and determination conditions. The controller 7 controls the communication unit 8 to execute communication with another electronic device having a communication function.

The communication unit 8 communicates in a wireless manner. As examples of wireless communication standards supported by the communication unit 8, there are a cellular phone communication standard such as 2G, 3G, and 4G, and a wireless local area communication standard. As a cellular phone communication standard, there are, for example, long term evolution (LTE), wideband code division multiple access (W-CDMA), worldwide interoperability for microwave access (WiMAX), CDMA 2000, personal digital cellular (PDC), global system for mobile communications (GSM (registered trademark)), personal handy-phone system (PHS), and the like. As a wireless local area communication standard, there are, for example, IEEE 802.11, Bluetooth (registered trademark), infrared data association (IrDA), near field communication (NFC), wireless personal area network (WPAN), and the like. As a communication standard of WPAN, there is, for example, ZigBee (registered trademark). The communication unit 8 may support one or more of the aforementioned communication standards. The wearable device 1 can transmit and receive various kinds of signals by performing wireless communication connection with, for example, other electronic devices (smartphones, notebook computers, televisions, and the like) having a wireless communication function.

The communication unit 8 may communicate with another electronic device such as the above-described mobile electronic device by wired connection thereto. In this case, the wearable device 1 is provided with a connector to which another electronic device is connected. The connector may be a general-purpose terminal such as universal serial bus (USB), high-definition multimedia interface (HDMI (registered trademark)), light peak (Thunderbolt (registered trademark)), or earphone microphone connector. The connector may be a dedicated terminal such as a Dock connector. The connector may be connected to any device including, for example, an external storage, a speaker, and a communication device in addition to the above-described electronic devices.

The storage 9 stores various kinds of programs and data. The storage 9 may include a nonvolatile storage device such as a flash memory. The program stored in the storage 9 includes a control program 90. The storage 9 may be configured by a combination of a portable storage medium such as a memory card and a read/write device that performs reading and writing from and to the storage medium. In this case, the control program 90 may be stored in the storage medium. The control program 90 may be acquired from a server device, a smartphone, a wristwatch type terminal, a notebook computer, a television, and the like in a wireless communication manner or a wired communication manner.

The control program 90 provides functions related to various kinds of controls for operating the wearable device 1. The control program 90 includes a detection processing program 90a and a display control program 90b. The detection processing program 90a provides a function of detecting the predetermined object existing in a scene in front of the user from a detection result of the detector 5. The detection processing program 90a provides a function of detecting a position of the predetermined object and a motion of the predetermined object in a scene in front of the user from a detection result of the detector 5. The display control program 90b provides a function of displaying an image so as to be capable of being visually recognized by the user and changing a display mode of the image according to the motion of the predetermined object.

Figure 3A:
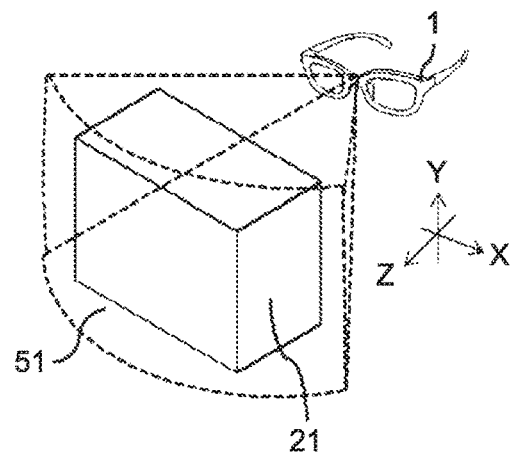
FIG. 3A is a diagram describing a relationship between a detection range of a detector and a display area of a display unit.
Figure 3B:
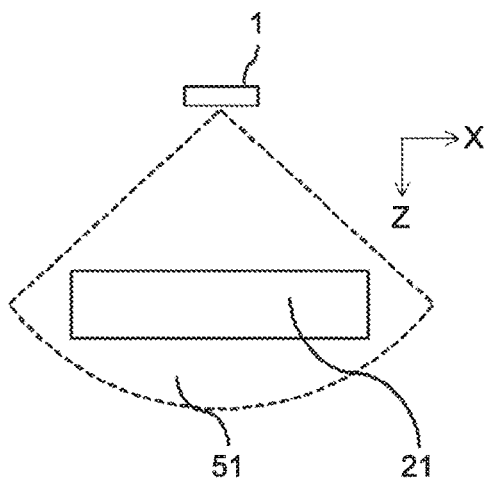
FIG. 3B is a diagram describing the relationship between the detection range of the detector and the display area of the display unit.
Figure 3C:
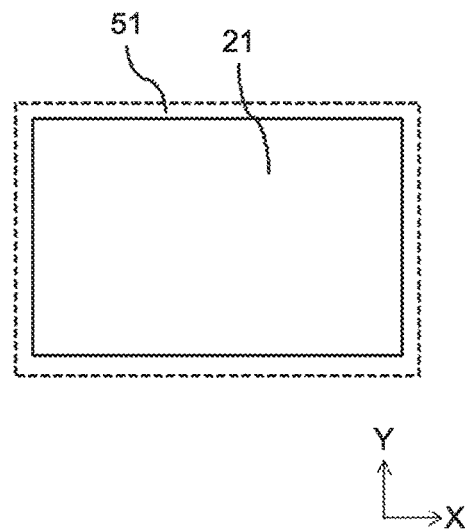
FIG. 3C is a diagram describing the relationship between the detection range of the detector and the display area of the display unit.

Then, referring to FIGS. 3A to 3C, a relationship between the detection range of the detector 5 and the display area of the display unit 2a and the display unit 2b will be described. FIGS. 3A to 3C are diagrams describing the relationship between the detection range of the detector and the display area of the display units. In embodiments, the detector 5 will be described as a sensor that detects a predetermined real object with infrared light. The detector 5 will be described as including an infrared irradiation unit that radiates infrared light and an infrared imager that can receive infrared light reflected from the predetermined real object (has infrared sensitivity). That is, the controller 7 detects the predetermined real object from the captured image of the infrared imager. In embodiments, the display image will be described as being displayed as if the display unit 2a and the display unit 2b existed at a position apart from the wearable device 1.

FIG. 3A is a perspective view schematically illustrating a detection range 51 of the detector 5 and a display area 21 of the display units 2a and 2b. FIG. 3B is a top view of FIG. 3A. FIG. 3C is a front view of FIG. 3A. In FIGS. 3A to 3C, a three-dimensional orthogonal coordinate system configured with an X axis, a Y axis, and a Z axis is defined. The X axis direction indicates the horizontal direction. The Y axis direction indicates the vertical direction or the long axis direction of the user's body. The Z axis direction indicates the front-back direction of the user. The positive Z axis direction indicates a direction of a greater depth in the irradiation of the infrared irradiation unit included in the detector 5. FIG. 3C corresponds to the field of view when the user visually recognizes the front.

As can be seen from FIGS. 3A to 3C, the detection range 51 has a three-dimensional space. The detector 5 including the infrared irradiation module and the infrared imager can detect the predetermined object in front of the user as a two-dimensional image and detect the shape of the predetermined object. The detector 5 can detect the predetermined object as a two-dimensional image and can acquire depth data corresponding to position coordinate data of each pixel of the image (that is, a depth image to which the depth data is added can be acquired). The depth data is data indicating the distance from the detector 5 to the real object (predetermined object) corresponding to each pixel in the two-dimensional image. Based on a detection result of the detector 5, the controller 7 can detect a body motion such as a bending motion and extension motion of a finger, a bending of a wrist, or rotation (turning-in or turning-out) of a forearm as a motion of the predetermined object in a case where the predetermined object is a user's arm, hand, finger, or a combination thereof (collectively referred to as upper limb).

In addition to the above-described body motions, the controller 7 may detect movement of a position of a specific portion of the upper limb within the detection range 51 as a body motion. The controller 7 may detect formation of a specific shape of the upper limb as a body motions. For example, the controller 7 may detect a form (sign "good") or the like in which the thumb is stretched upward while grasping other fingers as a body motion.

Even in a case where the imager 3 (out-camera) is applied as a detector, similarly to the detector 5, the controller 7 can perform detection of the predetermined object within the detection range (within the imaging range) and detection of the motion or the like of the predetermined object.

Then, as understood from FIGS. 3A to 3C, the display unit 2a and the display unit 2b display images so that the images can be visually recognized by user not in a portion of the wearable device 1 actually provided but in the display area 21 that is located apart from the wearable device 1 (hereinafter, sometimes, the images displayed by the display unit 2a and the display unit 2b being referred to as display images). At this time, the display units 2a and 2b may display the display images as a 3D object having a stereoscopic shape having a depth. The depth corresponds to a thickness in the Z axis direction. However, the display unit 2a and the display unit 2b do not display the images so that the images can be visually recognized by the user in the display area 21 that is located apart from the wearable device 1, but the images may be displayed on the portions of the display unit 2a and the display unit 2b of the wearable device 1 actually provided.

Figure 4:
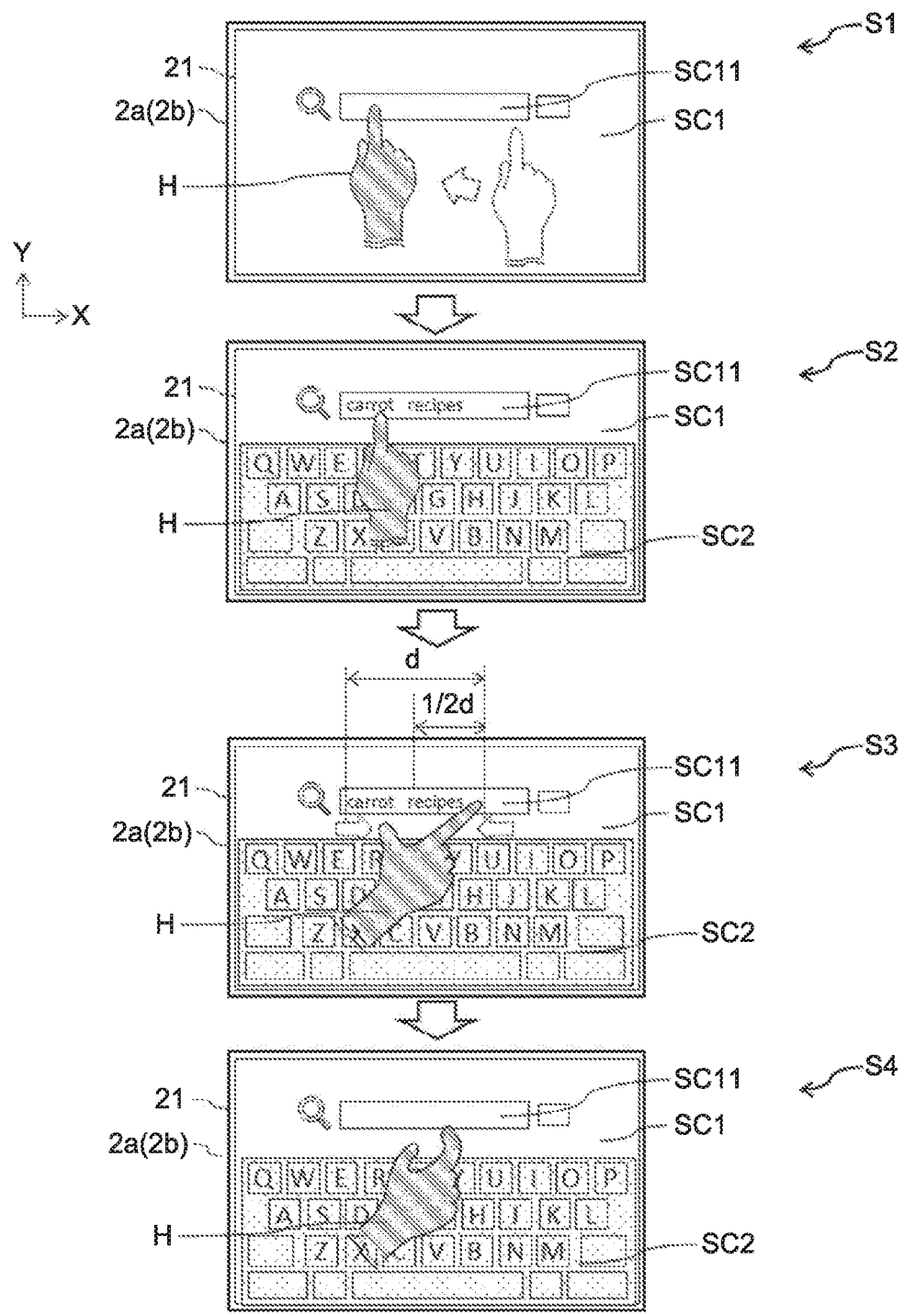
FIG. 4 is a diagram describing a first example of a function executed by the wearable device.

Then, functions executed by the wearable device 1 according to embodiments will be described with reference to FIGS. 4 to 11. The following various kinds of functions are provided by the control program 90. FIG. 4 is a diagram describing a first example of a function executed by the wearable device 1.

FIG. 4 illustrates the display unit 2a or the display unit 2b (hereinafter, sometimes, simply referred to as a display unit 2) of the wearable device 1, the display area 21 of the display unit 2, and the user's upper limb. In FIG. 4, an area that can be visually recognized two-dimensionally by the user is illustrated. The same applies to the examples illustrated in FIGS. 5 to 10 to be described later.

At step S1, the wearable device 1 executes a web browser application, inputs a search word desired by the user, displays a search screen SC1 for performing searching based on the search word on the display unit 2. The wearable device 1 displays, on the display unit 2, a display object (hereinafter, referred to as a hand object H) having substantially the same shape as that of the upper limb detected by the controller 7 based on a detection result of the detector 5 at the display position corresponding to the position of the user's upper limb in the detection range 51 of the detector 5. The wearable device 1 stores the coordinate position of the predetermined space within the detection range 51 of the detector 5 and the coordinate position of the display area 21 in association with each other. Therefore, while visually recognizing the display position of the hand object H, the user can move the hand object H to a desired position in the display area 21 by moving the upper limb in the real space. At step S1, based on the fact that the user extends the index finger of the upper limb in the real space, the wearable device 1 displays, on the display unit 2, the image emulating the hand extending the index finger as the hand object H.

As illustrated at step S1, the user moves the upper limb in the real space, so that the wearable device 1 moves the hand object H from the position indicated by the dotted line to the position where the fingertip of the index finger is superimposed on a character input area SC11 in the search screen SC1. The wearable device 1 recognizes that the character input operation is started by the user. The hand object H is moved to the position where the hand object H is superimposed on the character input area SC11, so that the wearable device 1 recognizes that the operation of inputting the characters is started by the user. For example, as illustrated at step S2, the wearable device 1 displays character keys SC2 capable of inputting characters in accordance with a change in the position and shape of the hand object H based on the body motion of the upper limb in a manner such that the character keys SC2 are superimposed on a portion of the search screen SC1. At step S2, the wearable device 1 displays the character string "carrot recipes" that was input at the time of activation of the previous web browser application on the character input area SC11 in the search screen SC1.

Then, in the state where the hand object H is located in the vicinity of the character input area SC11, the user performs the motion (pinching motion) of allowing the index finger and the thumb to approach each other from the state where the index finger and the thumb of the upper limb are extended. At step S3, in the wearable device 1, when the state where the index finger and the thumb of the upper limb are extended is detected, the input character string "carrot recipes" is considered to be selected by the user. At step S4, the wearable device 1 erases the character string "carrot recipes" that is considered to be selected by the user when the motion of allowing the index finger and the thumb of the upper limb to approach each other is detected. Herein, the "motion of allowing the index finger and the thumb to approach each other" indicates a motion of allowing a predetermined area (for example, a fingertip) of the index finger and a predetermined area (for example, a fingertip) of the thumb to approach each other. The "fingertip" may be, for example, a portion extending from the first interphalangeal joint of the finger to the tip of the finger.

As described above, the wearable device 1 according to embodiments includes the display unit 2 that displays characters, the detector 5 that detects the predetermined object existing in the real space, and the controller 7 that executes the character selection process of selecting characters when a first body motion of allowing the one part (the index finger in the first example) and the other part (the thumb in the first example) of the upper limb to approach each other is detected from the detection result of the detector 5. With such a configuration, in the wearable device 1, since it is possible to select characters by a simpler motion such as a pinching motion, the wearable device is conveniently used by the user.

In the wearable device 1 according to embodiments, when the motion (first body motion) of allowing the fingertip of the index finger and the fingertip of the thumb to approach each other is detected, the controller 7 detects the distance between the fingertip of the index finger and the fingertip of the thumb which is changed based on the motion. The controller 7 may execute the character selection process on the occasion that the detected distance becomes equal to or less than the predetermined length. Herein, the "distance between the fingertip of the index finger and the fingertip of the thumb" may denote the distance in the real space between the fingertip of the index finger and the fingertip of the thumb of the actually existing upper limb or may denote the distance between the fingertip of the index finger and the fingertip of the thumb of the hand object H. In a case where the "distance between the fingertip of the index finger and the fingertip of the thumb" denotes the distance between the fingertip of the index finger and the fingertip of the thumb of the hand object H, the "predetermined length" may be, for example, half the length of the character string to be subjected. In the example illustrated in FIG. 4, in the wearable device 1, when the first body motion is detected, in a case where the distance between the fingertip of the index finger and the fingertip of the thumb in the hand object H is equal to or less than the length (½d) of half the length d of the portion where the character string "carrot recipes" is displayed, the character string is considered to be selected by the user. The "predetermined length" may be a length that can be considered to denote that the fingertip of the index finger and the fingertip of the thumb are in contact with each other, that is, zero.

In the wearable device 1 according to embodiments, when the first body motion is detected and it is detected that the moving speed of the one part (the index finger in the first example) or the other part (the thumb in the first example) is equal to or higher than a first speed, the controller 7 may be allowed to execute the character selection process. With such a configuration, the wearable device 1 can be allowed to easily execute character selection by the body motion intended by the user.

Figure 5:
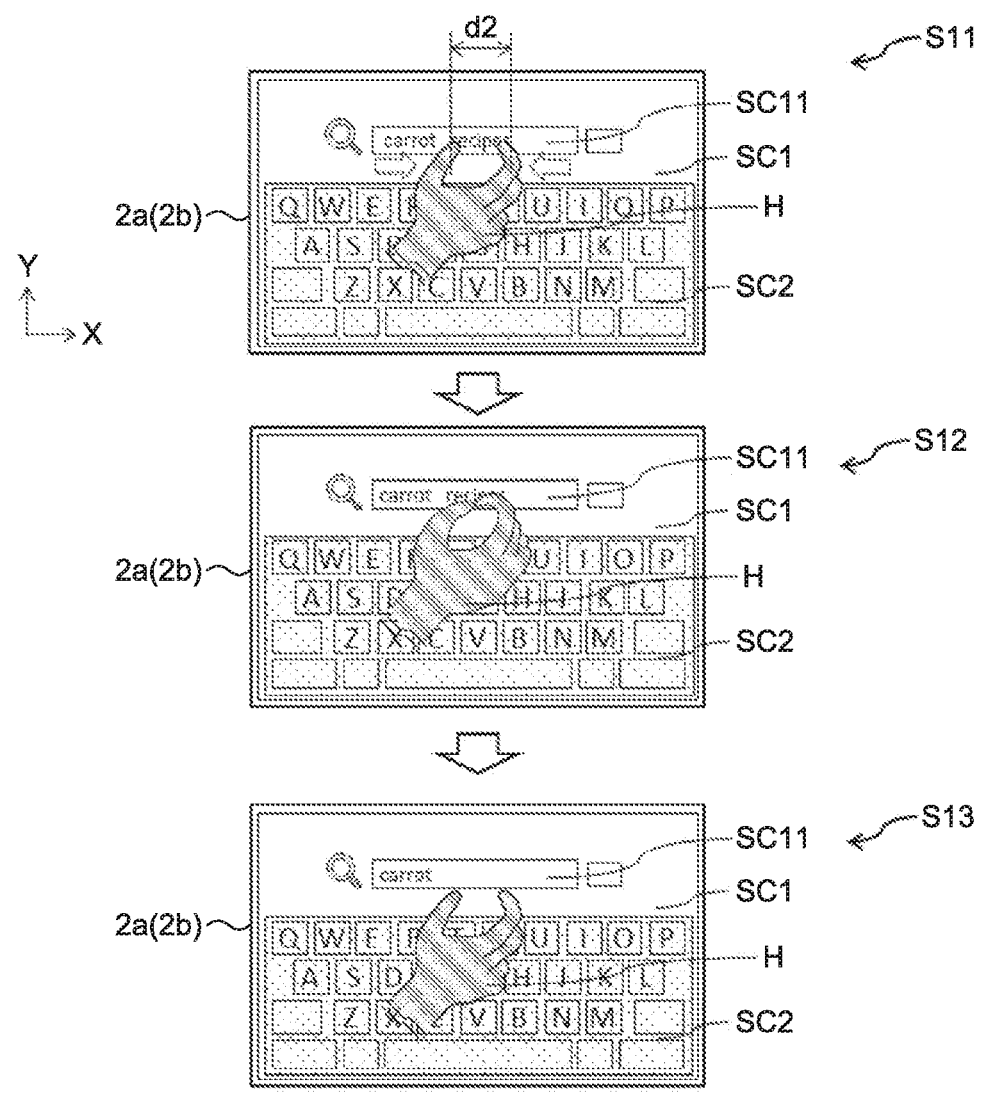
FIG. 5 is a diagram describing a second example of a function executed by the wearable device.

FIG. 5 is a diagram describing a second example of a function executed by the wearable device 1. Similarly to the first example, the second example illustrates a case where the web browser application is activated.

At step S11, the wearable device 1 displays the search screen SC1 and the character keys SC2 on the display unit 2. The wearable device 1 displays the character string "carrot recipes" that was input at the time of activation of the previous web browser application in the character input area SC11 of the search screen SC1. The wearable device 1 displays, on the display unit 2, the hand object H having substantially the same shape as that of the upper limb detected by the controller 7 based on a detection result of the detector 5 at the display position corresponding to the position of the user's upper limb in the detection range 51 of the detector 5.

At step S11, the user moves the upper limb to locate the fingertip of the thumb of the hand object H at the head of the character string "recipes" and to locate the fingertip of the index finger at the tail of "recipes". At this time, the fingertip of the thumb and the fingertip of the index finger of the hand object H are separated by the length d2 of the display area of "recipes". Then, the user performs a motion (first body motion) of allowing the fingertip of the index finger and the fingertip of the thumb to approach each other from the state illustrated at step S11. At step S12, in the wearable device 1, when the first body motion is detected, the portion "recipes" of the character string "carrot recipes" is considered to be selected by the user. In the example illustrated at step S12, the wearable device 1 displays, on the display unit 2, the hand object H having substantially the same shape as that of the upper limb performing the first body motion. At step S13, the wearable device 1 erases the character string "recipes" which is considered to be selected by the user from the character input area SC11.

As described above, in the wearable device 1 according to embodiments, the display unit 2 displays a character string configured with a plurality of characters, and when the first body motion is detected, the controller 7 executes the character selection process on characters ("recipes" in the second example) having the number of characters defined by the position of the one part (the fingertip of the thumb) and the position of the other part (the fingertip of the index finger) of the hand object H that are immediately before the first body motion in the character string is detected. Herein, similarly to the second example, the "characters having the number of characters defined by the position of the one part and the position of the other part of the hand object H" may be a character string included between the character "r" superimposed on the one part (the fingertip of the thumb) of the hand object H and the character "s" superimposed on the other part (the fingertip of the index finger) of the hand object H (character string also including "r" and "s"), that is, "recipes". The "characters having the number of characters defined by the position of the one part and the position of the other part of the hand object H" may be a character string included between a character displayed at the X coordinate position which is substantially the same as the X coordinate position of the one part of the hand object H (the Y axis coordinate position is not necessarily the same) and a character displayed at the X coordinate position which is substantially the same as the X coordinate position of the other part of the hand object H (the Y axis coordinate position is not necessarily the same). The "characters having the number of characters defined by the position of the one part and the position of the other part of the hand object H" may be a character string having substantially the same length as the component in the X axis direction of the distance between the position of the one part and the position of the other part of the upper limb (that is, the component in the input direction of the character string). In a case where a plurality of words ("carrot" and "recipes") are displayed as in the second example, the one part where the length of the display area of the word in the X axis direction is closer to the component in the X axis direction of the distance between the position of the one part and the position of the other part of the upper limb may be considered to be "the characters having the number of characters defined by the position of the one part and the position of the other part of the hand object H".

In the first example, it is described that, when the first body motion is detected and it is detected that the moving speed of the one part or the other part of the upper limb in the first body motion is equal to or higher than the first speed, the wearable device 1 may be allowed to execute the character selection process. On the other hand, the wearable device 1 does not execute the character selection process depending on the movement of the one part or the other part of the upper limb of which speed is lower than the first speed. Therefore, the user can specify the character string or the number of characters desired by the user by appropriately moving the one part or the other part of the upper limb at a speed lower than the first speed (if the first body motion at or above the first speed is performed after the character string is specified, the character selection process is executed on the specified character string). When the position of the one part and the position of the other part of the hand object H in the display area 21 are not changed for a predetermined time or more, the wearable device 1 may consider the character string or the number of characters desired by the user to be specified based on the positions.

In the first example and the second example described above, illustrated is the example where, when the first body motion of the user is detected, the wearable device 1 executes a character erasing process of erasing characters selected by the controller 7 in the character selection process. Herein, similarly to the first example and the second example, at the time of displaying the character input area SC11 (referred to as a character input screen) on the search screen SC1 by the display unit 2, if characters (character string "carrot recipes") input before the time of displaying are displayed, the controller 7 monitors the presence or absence of detection of the first body motion. The controller 7 may have a configuration of executing a character erasing process on the input character "carrot recipes" on the occasion that the first body motion is detected. Similarly to the first example and the second example, sometimes, the wearable device 1 displays again the character string that was input at the time of the last activation when the predetermined application is activated. In this case, since the wearable device 1 can erase the characters displayed again at one time by a simple motion like the above-described first body motion, the wearable device is conveniently used by the user. When the second body motion of allowing the one part and the other part of the upper limb to be separated from each other is detected after the character erasing process is executed as a body motion, the wearable device 1 may input the erased characters again. When the second body motion is detected within a predetermined time after the character erasing process is executed, the wearable device 1 may input the erased characters again.

Figure 6:
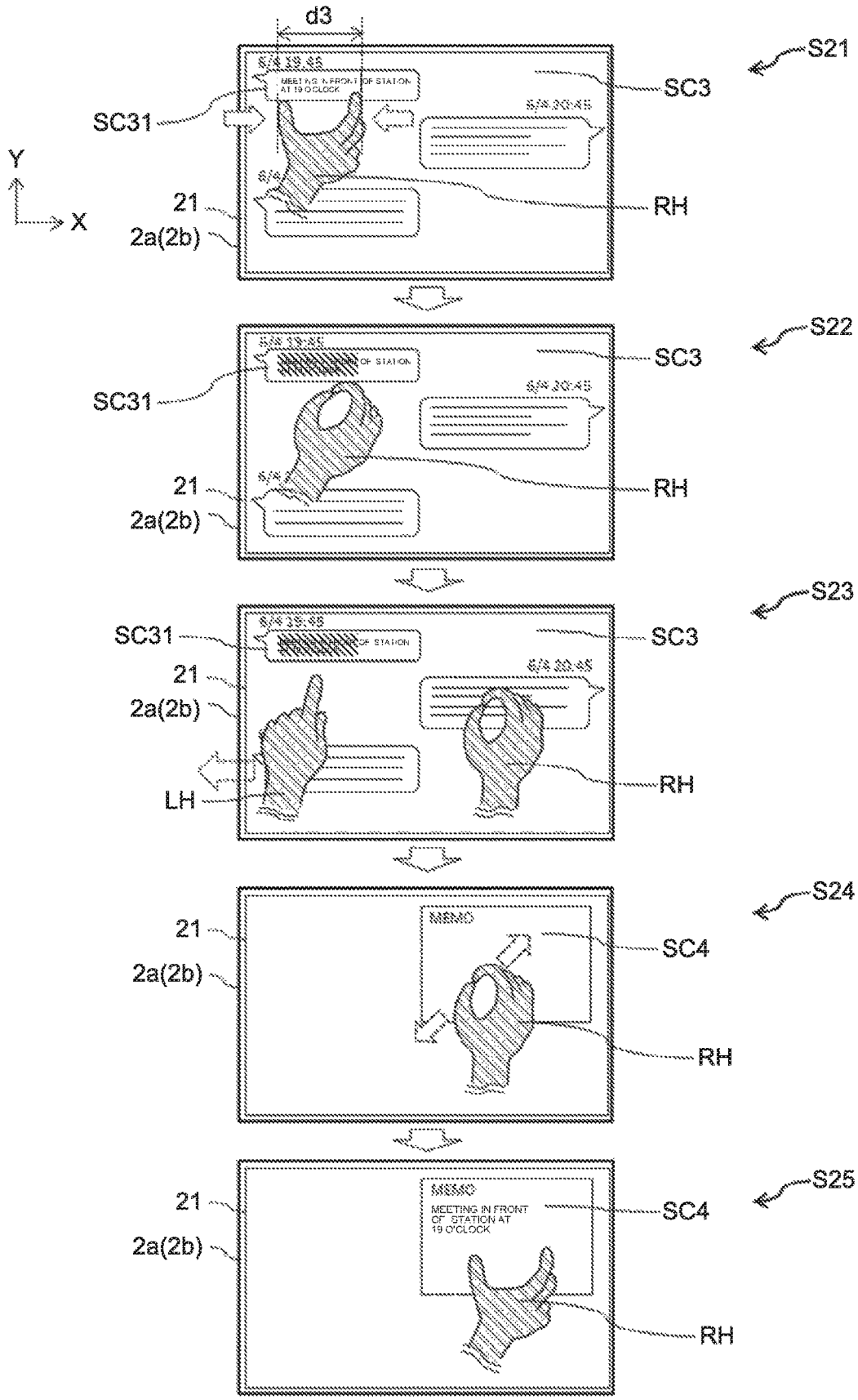
FIG. 6 is a diagram describing a third example of a function executed by the wearable device.

FIG. 6 is a diagram describing a third example of a function executed by the wearable device 1. The third example illustrates a case where the mail application is activated by the wearable device 1.

At step S21, the wearable device 1 displays a mail screen SC3 indicating mail exchange with another communication terminal on the display unit 2. The wearable device 1 displays, on the display unit 2, the right hand object RH having substantially the same shape as that of the right upper limb detected by the controller 7 based on a detection result of the detector 5 at the display position corresponding to the position of the user's right upper limb in the detection range 51 of the detector 5. The right hand object RH is displayed to be superimposed on a portion of the message SC31 in the mail screen SC3.

Herein, when the user moves the right upper limb to perform a motion (first body motion) of allowing the fingertip of the index finger and the fingertip of the thumb of the right hand object RH to approach each other, the wearable device 1 executes the character selection process. At step S22, the wearable device 1 executes the character selection process on a portion of the character strings "In front of OO Station at 19 o'clock" in the message SC31 based on the position of the fingertip of the index finger and the position of the fingertip of the thumb of the right hand object RH that are immediately before the first body motion is performed or based on the fact that the fingertip of the index finger and the fingertip of the thumb are separated from each other by the only distance d3. Then, the wearable device 1 executes the character selection process and also executes the copying process of copying the character string "In front of OO Station at 19 o'clock", that is, the process of temporarily storing the character string "In front of OO Station at 19 o'clock". In order to allow it to be easily visually recognized that the copying process is performed on the character string "In front of OO Station at 19 o'clock", the wearable device 1 changes the display mode of the character string "In front of OO Station at 19 o'clock".

At step S22, after executing the copying process, the user moves the left upper limb within the detection range 51 of the detector 5 of the wearable device 1. At step S23, the wearable device 1 displays, on the display unit 2, the left hand object LH having substantially the same shape as that of the left upper limb based on a detection result of the detector 5. At step S23, for example, the user moves the left upper limb in the left direction in the real space. At step S24, the wearable device 1 moves the display position of the left hand object LH in the left direction in the display area 21 and transitions the display from the mail screen SC3 to another screen based on the movement of the left upper limb. As illustrated at step S24, the screen after the transition is, for example, the memo screen SC4 that allows the user to input characters by a user's operation.

At step S24, the user moves the right upper limb in the real space to move the right hand object RH on the memo screen SC4, so that the index finger and the thumb of the right hand object RH are separated from each other (the second body motion is performed). At step S25, in the wearable device 1, when the second body operation is detected, the character string "In front of OO Station at 19 o'clock" temporarily stored by the copying process is input (pasted) into the memo screen SC4.

As described above, in the wearable device 1 according to embodiments, when the first body motion is detected, the controller 7 executes the copying process of copying the characters (the character string "In front of OO Station at 19 o'clock" in the third example) selected by the character selection motion.

In the wearable device 1 according to embodiments, when the second body motion of allowing the one part (the fingertip of the thumb) and the other part (the fingertip of the index finger) of the hand object H to separate from each other is detected as a body motion after the copying process is executed, the controller 7 executes the pasting process of pasting the characters copied by the character selection motion into the display unit 2. The wearable device 1 may cancel the state where the copying process is executed after the pasting process is executed, that is, may change into the state where the temporarily stored character string is not stored. The wearable device 1 may maintain the state where the copying process is executed even after the pasting process is executed, that is, may continuously store the character string selected by the character selection process. According to this configuration, the wearable device 1 can allow the pasting process to be executed as many times as the user repeatedly performs the first body motion. The wearable device 1 may maintain the state where the copying process is executed even after the pasting process is executed and may replace the temporarily stored character string with another character string when the character selection process is executed on another character string based on the user's operation.

When the character selection process and the copying process are executed based on the first body motion, the wearable device 1 may determine whether or not the state where the one part and the other part of the upper limb that are after the first body motion approach each other is maintained. For example, when the state is maintained, the wearable device 1 continues to execute the character selection process and the copying process, and on the other hand, when the state is released, that is, when the one part and the other part of the upper limb are separated from each other, the wearable device 1 may cancel the character selection process and the copying process.

The wearable device 1 may execute the character selection process and the copying process on a first character string based on the first body motion by the right upper limb, and on the other hand, the wearable device 1 may execute the character selection process and the copying process on a second character string based on the first body motion by the left upper limb. In this case, the wearable device 1 may determine whether the second body motion is performed by the left upper limb or by the right upper limb at the time of executing the pasting process of the selected character string based on the second body motion. For example, the wearable device 1 may execute a process of pasting the first character string in the case of the second body motion by the left upper limb, and on the other hand, the wearable device 1 may execute a process of pasting the second character string in the case of the second body motion by the right upper limb. The wearable device 1 may execute the character selection process and the copying process on the first character string based on the first body motion of allowing the thumb and index finger of the upper limb to approach each other, and on the other hand, the wearable device 1 may execute the character selection process and the copying process on the second character string based on the first body motion of allowing the thumb and middle finger of the upper limb to approach each other. In this case, the wearable device 1 determines whether the second body motion is a motion of separating the thumb and the index finger or a motion of separating the thumb and the middle finger at the time of executing the pasting process of the selected character string based on the second body motion. For example, the wearable device 1 may execute the process of pasting the first character string in the case of the motion of allowing the thumb and the index finger to be separated from each other, and on the other hand, the wearable device 1 may execute the process of pasting the second character string in the case of the motion of allowing the thumb and the middle finger to be separated from each other. According to such a configuration, since the wearable device 1 can execute different copying processes by as many as the number corresponding to the types of combination of the one part and the other part of the upper limb in the first body motion, operability of the wearable device 1 is improved.

Figure 7:
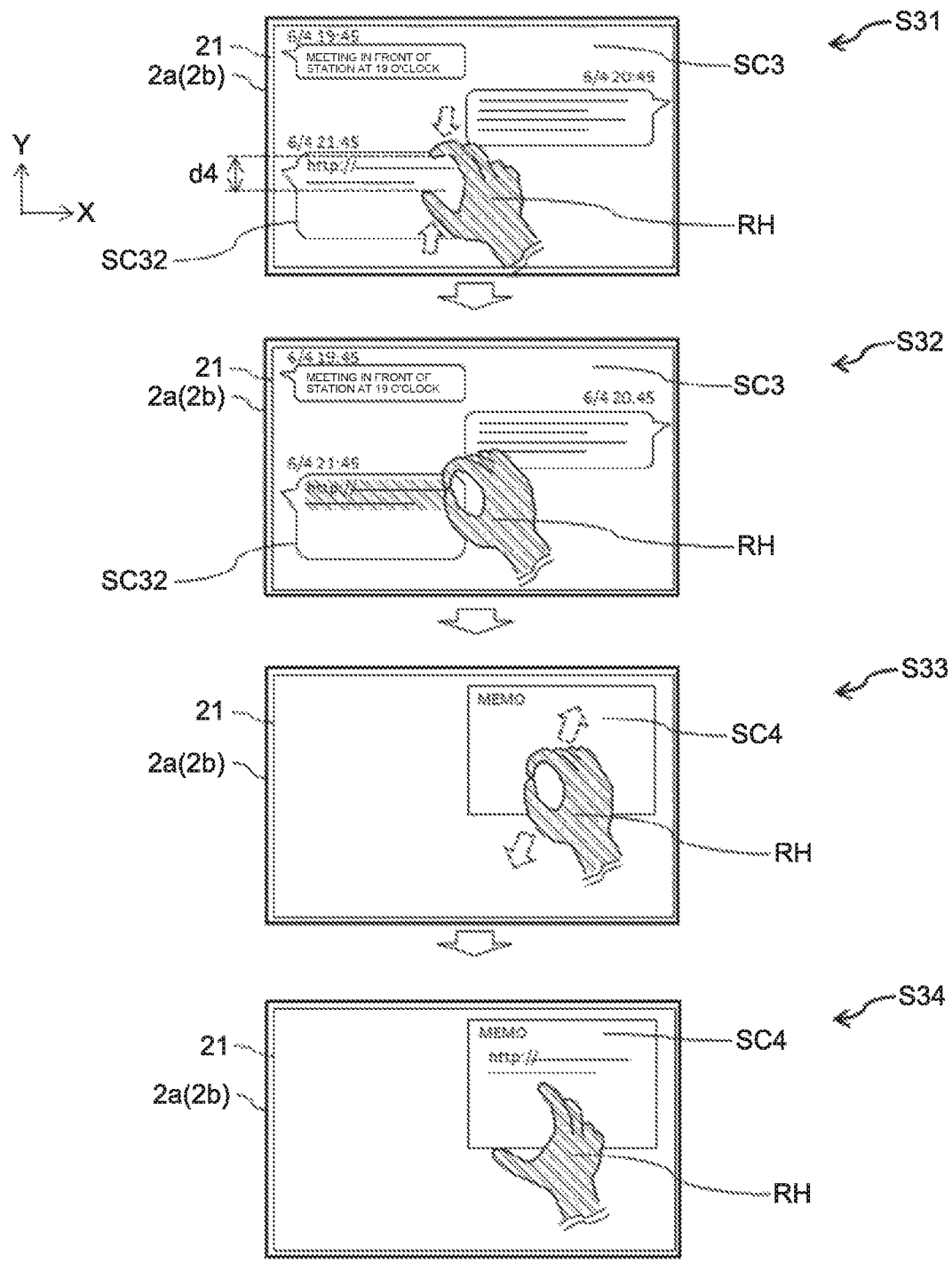
FIG. 7 is a diagram describing a fourth example of a function executed by the wearable device.

FIG. 7 is a diagram describing a fourth example of a function executed by the wearable device 1. The wearable device 1 activates the mail application. At step S31, the wearable device 1 displays the mail screen SC3 and the right hand object RH on the display unit 2. Also, a right hand object RH is displayed to be superimposed on a portion of the message SC32 in the mail screen SC3.

Herein, when the user moves the right upper limb to perform a motion (first body motion) of allowing the fingertip of the index finger and the fingertip of the thumb of the right hand object RH to approach each other, the wearable device 1 executes the character selection process. At step S32, the wearable device 1 executes the character selection process on the character string having the number of lines based on the position of the fingertip of the index finger and the position of the fingertip of the thumb of the right hand object RH that are immediately before the first body motion is performed in the message SC32 including the character string configured with a plurality of lines. In the example illustrated in FIG. 7, the wearable device 1 executes the character selection process on the character string "http:// . . . " having the number of lines for two lines based on the fact that the fingertip of the index finger and the fingertip of the thumb are separated from each other by only a distance d4. Then, the wearable device 1 executes the character selection process and also executes the copying process of copying the character string "http:// . . . ", that is, executes the process of temporarily storing the character string "http:// . . . ". In the example illustrated at step S32, in order to allow it to be easily visually recognized that the copying process is performed on the character string "http:// . . . ", the wearable device 1 changes the display mode of the character string "http:// . . . ".

At step S33, the wearable device 1 transitions the display from the mail screen SC3 to another screen (the memo screen SC4) based on the fact that the predetermined operation is performed by the user as illustrated at step S23 of FIG. 6 after the copying process is executed. At step S33, the user moves the right upper limb in the real space to move the right hand object RH on the memo screen SC4, so that the index finger and the thumb of the right hand object RH are separated from each other (the second body motion is performed). At step S34, the wearable device 1 inputs (pastes) the character string "http:// . . . " temporarily stored by the copying process into the memo screen SC4.

As described above, in the wearable device 1 according to embodiments, the display unit 2 displays the character string configured with a plurality of lines, and when the first body motion is detected, the controller 7 executes the character selection process on the character string (the character string having two lines in the example of FIG. 7) having the number of lines defined by the position of the one part and the position of the other part of the upper limb that are immediately before the first body motion is detected. Herein, similarly to the example illustrated in FIG. 7, the "character string having the number of lines defined by the position of the one part and the position of the other part of the upper limb" may be a character string constituting a line superimposed on the one part (the fingertip of the thumb) of the hand object H, a line superimposed on the other part (the fingertip of the index finger) of the hand object H, and a line included between the two lines. In addition, the "character string having the number of lines defined by the position of the one part and the position of the other part of the upper limb" may be a character string constituting a line displayed at the Y coordinate position which is substantially the same as the Y coordinate position of the one part of the hand object H (the X axis coordinate position is not necessarily the same), a line displayed at the Y coordinate position which is substantially the same as the Y coordinate position of the other part of the hand object H (the X axis coordinate position is not necessarily the same), and another line included between the two lines. In addition, the "character string having the number of lines defined by the position of the one part and the position of the other part of the upper limb" may be a character string having the number of lines that is substantially the same length as the component in the Y direction of the distance between the position of the one part and the position of the other part of the upper limb (that is, the component in the direction perpendicular to the input direction of the character string). The wearable device 1 may allow the upper line or the lower line including another character string constituting one phrase (or one semantic content) continuously following the character string having the defined lines as well as the lines defined by the position of the one part and the position of the other part of the upper limb to be subjected to the character selection process. For example, assuming that the character string "http:// . . . " constitutes one URL with a character string having two lines, even if only one line (a portion of the character string "http:// . . . ") is specified, all lines (two lines) of the character string "http:// . . . " can be allowed to be subjected to the character selection process. In a case where the message SC32 (character string to be subjected) includes a paragraph configured with a plurality of lines, the wearable device 1 may allow all of the paragraph including the lines defined by the position of the one part and the position of the other part of the upper limb to be subjected to the character selection process. In a case where the message SC32 (character string to be subjected) includes a plurality of paragraphs, the wearable device 1 may allow both of a first paragraph including lines superimposed on the position of the one part of the upper limb and a second paragraph including lines superimposed on the position of the other part of the upper limb (or, in a case where there is another paragraph between the first paragraph and the second paragraph, another paragraph is included) to be subjected to the character selection process.

Figure 8A:
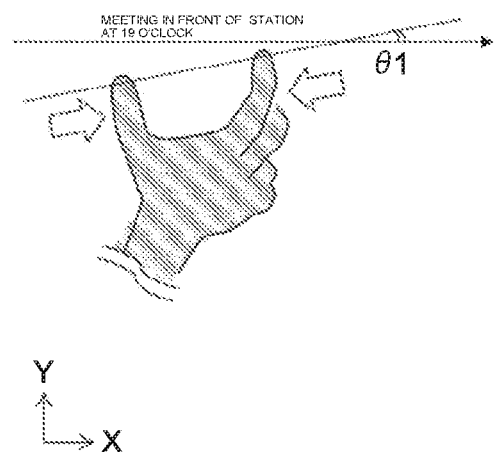
FIG. 8A is a diagram describing a condition of a direction in which the one part and the other part of the upper limb approach each other in a first body motion for executing a character selection process.
Figure 8B:
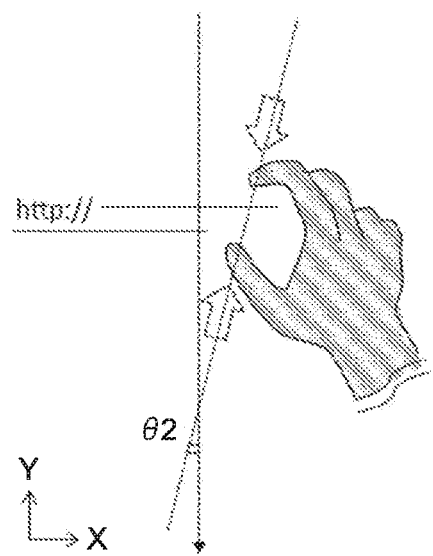
FIG. 8B is a diagram describing a condition of the direction in which the one part and the other part of the upper limb approach each other in the first body motion for executing the character selection process.

In each of the above-described embodiments, it is illustrated that it is possible to specify the range to be subjected to the character selection process in definition of both the horizontal direction and the vertical direction of the character string. Then, conditions of the direction in which the one part and the other part of the upper limb approach each other in the first body motion for executing the character selection process will be described with reference to FIG. 8. FIGS. 8A and 8B are diagrams describing the conditions of the direction in which the one part and the other part of the upper limb approach each other in the first body motion for executing the character selection process.

As illustrated in FIG. 8A, when the first body motion is detected, the controller 7 calculates an angle $\theta1$ at which a direction in which the one part and the other part of the upper limb approach each other and an input direction (X axis direction) in which the characters are sequentially input intersect each other. The controller 7 may execute the character selection process in a case where the angle $\theta1$ is equal to or less than a first angle. Herein, the angle $\theta1$ may be appropriately set within a range of, for example, 0 to 45 degrees.

As illustrated in FIG. 8B, the controller 7 calculates an angle $\theta2$ at which the direction in which the one part and the other part of the upper limb approach each other and a direction (Y axis direction) perpendicular to the input direction of the characters intersect each other. The controller 7 may execute the character selection process in a case where the angle $\theta2$ is equal to or less than a second angle. Herein, the angle $\theta2$ may be appropriately set within a range of, for example, 0 to 45 degrees.

Figure 9:
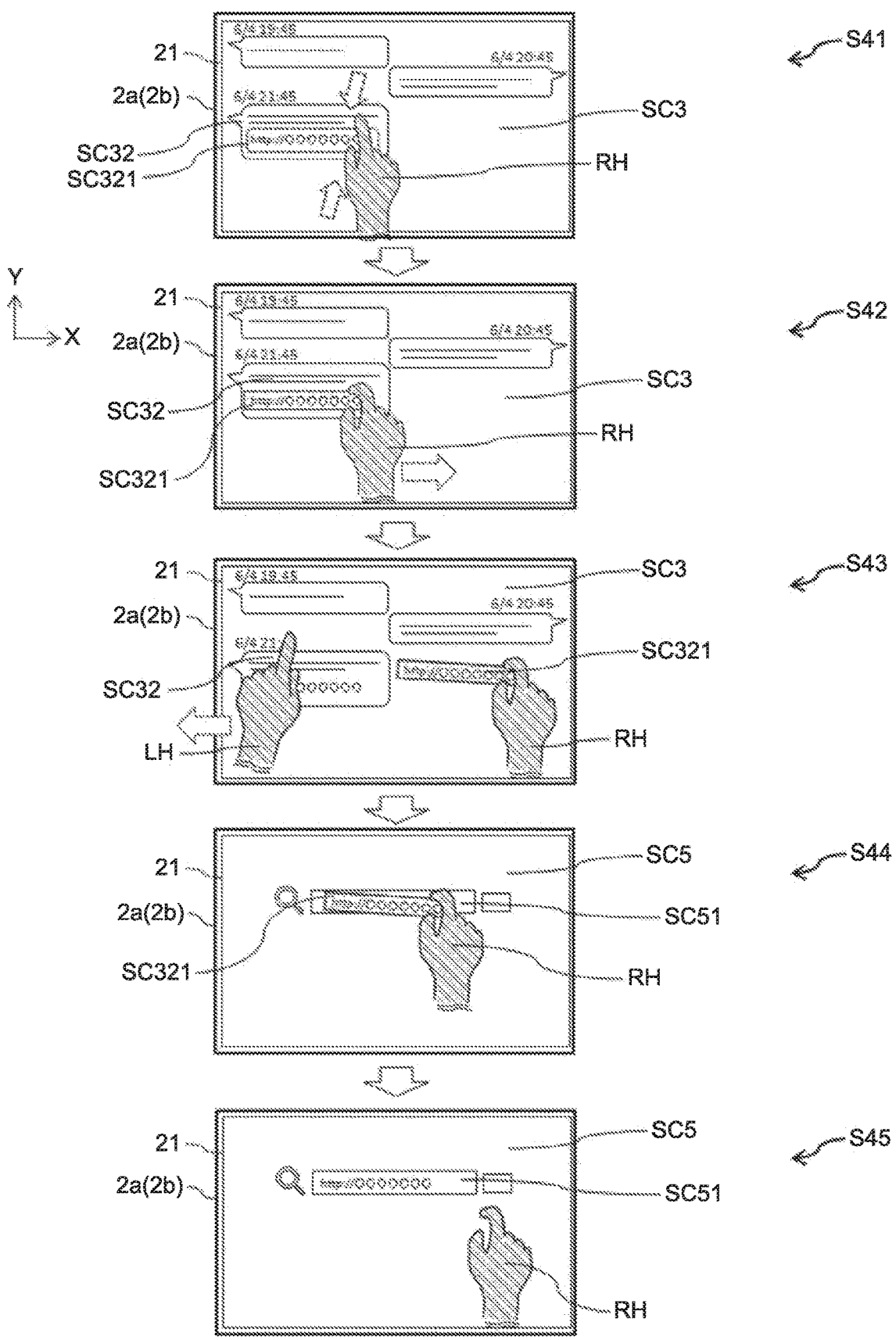
FIG. 9 is a diagram describing a fifth example of a function executed by the wearable device.

FIG. 9 is a diagram describing a fifth example of a function executed by the wearable device 1. The fifth example illustrates a case where the mail application is activated. At step S41, the wearable device 1 displays the mail screen SC3 and the right hand object RH on the display unit 2. The right hand object RH is displayed to be superimposed on a portion of the message SC32 in the mail screen SC3.

Herein, when the user moves the right upper limb to perform a motion (first body motion) of allowing the fingertip of the index finger and the fingertip of the thumb of the right hand object RH to approach each other, the wearable device 1 executes the character selection process. At step S42, the direction in which the fingertip of the index finger and the fingertip of the thumb approach each other in the first body motion is the substantially vertical direction (Y axis direction), and the wearable device 1 allows the message SC321 to be subjected to the character selection process based on the fact that the fingertip of the index finger of the right hand object RH that is after the first body motion is located at the upper end of the message SC321 and the fingertip of the thumb is located at the lower end of the message SC321. The wearable device 1 changes the display mode of the message SC321 on the occasion that the message SC321 is considered to be selected by the user. The example illustrated in FIG. 9 is different from each of the above-described embodiments in terms of determining the character string to be subjected to the character selection process based on the position of the one part and the position of the other part of the upper limb that are after the first body motion.

At step S42, the user moves the upper limb in the real space in the state where the right hand object RH is pinching the message SC321, that is, in the state where the distance between the index finger and the thumb is maintained substantially the same. This motion is detected, so that, at step S43, the wearable device 1 moves the right hand object RH to the right in the display area 21 of the display unit 2. In this case, the wearable device 1 executes the copying process of copying the characters constituting the message SC321 selected by the character selection process and moves the display position of the message SC321 to the right.

Then, at step S43, the user moves the left upper limb within the detection range 51 of the detector 5 of the wearable device 1. At step S43, the wearable device 1 displays, on the display unit 2, the left hand object LH having substantially the same shape as that of the left upper limb based on a detection result of the detector 5. Then, for example, when the user moves the left upper limb to the left in the real space, the wearable device 1 detects the body motion of the left upper limb from a detection result of the detector 5 and moves the display position of the left hand object LH to the left in the display area 21. At step S43, when the body motion of the left upper limb is detected, the wearable device 1 considers that the operation is performed by the user, and the wearable device 1 transitions the display, for example, from the mail screen SC3 to another screen. The screen after the transition is, for example, a search screen SC5 as illustrated at step S44. At the time of transitioning the display from the mail screen SC3 to the search screen SC5, the wearable device 1 maintains the display of the message SC321 pinched by the right hand object RH, that is, maintains the state where the characters in the message SC321 are copied.

At step S44, the user moves the right upper limb in the real space, so that the wearable device 1 moves the display position of the right hand object RH so that the message SC321 is superimposed on a character input area SC51 in the search screen SC5. At step S45, the wearable device 1 executes a pasting process of inputting, that is, pasting the copied characters in the message SC321 into the character input area SC51. The wearable device 1 is not limited to pasting the characters in the message SC321 into the character input area SC51 based on the movement of the display position of the right hand object RH so that the message SC321 is superimposed on the character input area SC51. For example, the wearable device 1 may allow the characters in the message SC321 to be pasted into the character input area SC51 based on the fact that the display position of the right hand object RH is moved so that the message SC321 is superimposed on the character input area SC51 and, after the movement, the fingertip of the index finger and the fingertip of the thumb of the right hand object RH are separated from each other. In this case, in order to paste the characters constituting the message SC321 into the character input area SC51, the user may move the right upper limb in real space and execute the motion (second body motion) of allowing the fingertip of the index finger and the fingertip of the thumb to be separated from each other.

As described above, the fifth example is different from each of the above-described embodiments in terms that the character string to be subjected to the character selection process is determined based on the position of the one part and the position of the other part of the upper limb that are after the first body motion rather than before the first body motion. In the fifth example, the operation for executing the character selection process on the message SC321 is not necessarily the first body motion of allowing the one part and the other part of the upper limb to approach each other. For example, the wearable device 1 may execute the character selection process on the message SC321 based on only the fact that the one part of the upper limb is located at the upper end of the message SC321 and the other part is located at the lower end of the message SC321. Alternatively, the wearable device 1 may execute the character selection process on the message SC321 based on the fact that the state where the one part of the upper limb is located at the upper end of the message SC321 and the other part of the upper limb is located at the lower end of the message SC321 has continued for a predetermined time or more.

As illustrated in FIG. 9, the wearable device 1 according to embodiments is the wearable device 1 that is attachable to a head and includes the display unit 2 that displays the character string configured with a plurality of characters, the detector 5 that detects the user's upper limb existing in the real space, and the controller 7 that executes the character selection process of selecting the first character string (the message SC321 in the example of FIG. 9) included in the range defined by the position of the one part and the position of the other part of the upper limb detected by the detector 5 in the character string, in which the controller 7 executes a predetermined process (the copying process of copying the character string in the message SC321 in the example of FIG. 9) on the first character string based on the fact that a predetermined body motion of the upper limb (the motion of moving the upper limb to the right in the example of FIG. 9) has been detected in the state where the distance between the one part and the other part of the upper limb is maintained substantially the same during execution of the character selection process. Herein, the predetermined body motion may be, for example, a motion of moving the upper limb in the direction substantially perpendicular to (or intersect with, at an angle within a predetermined range) the direction in which the one part and the other part approach each other in the motion of allowing the one part and the other part of the upper limb to approach each other for executing the character selection process. In this motion, it is difficult for the body motion to confuse between the operation for executing the character selection process and the operation for executing the predetermined process, so that erroneous operation hardly occurs.

Figure 10:
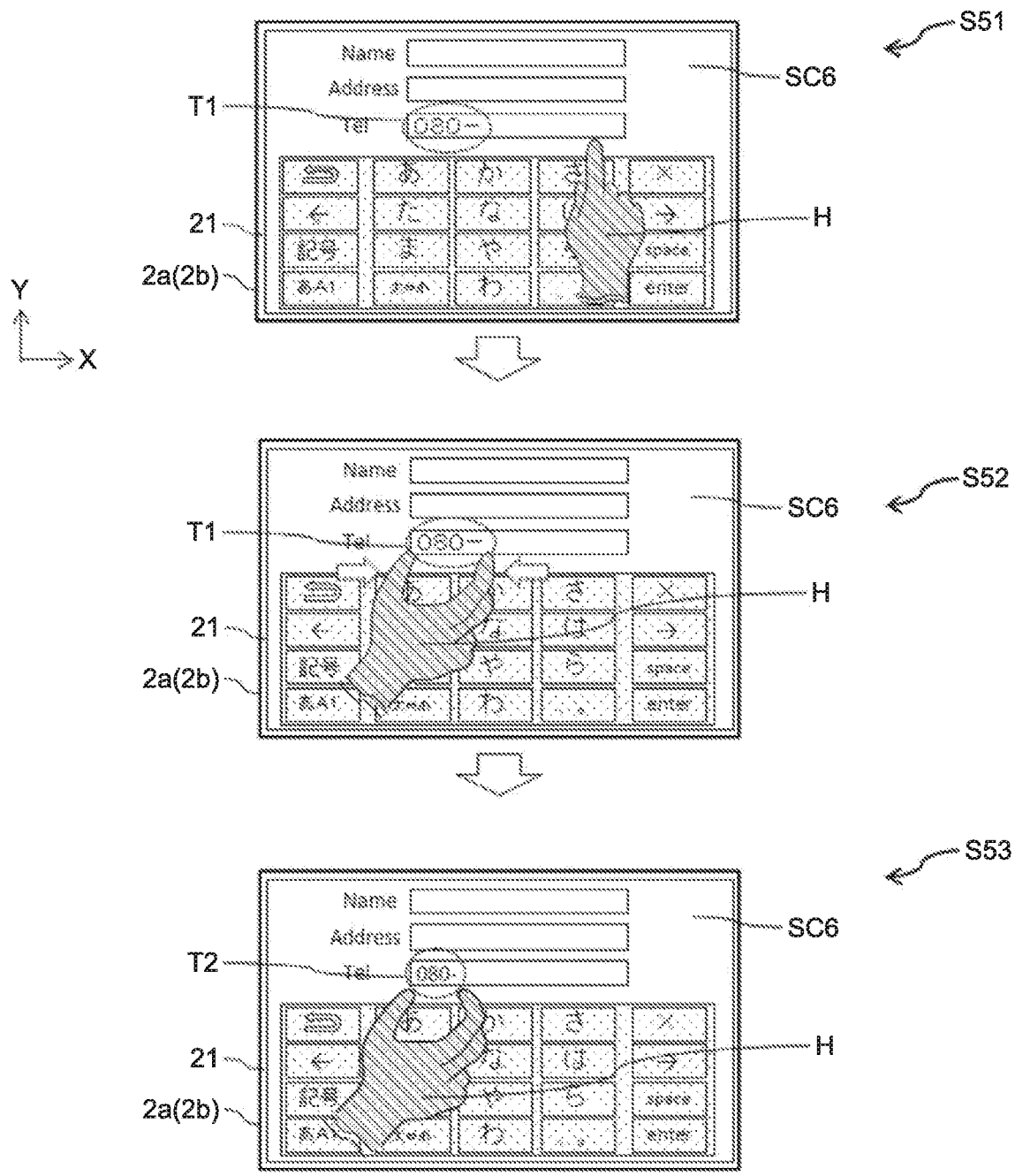
FIG. 10 is a diagram describing a sixth example of a function executed by the wearable device.

FIG. 10 is a diagram describing a sixth example of a function executed by the wearable device 1. As illustrated at step S51, the wearable device 1 displays, on the display unit 2, an input form SC6 for allowing the user to input predetermined information. The wearable device 1 displays, on the display unit 2, the hand object H having substantially the same shape as that of the upper limb detected based on the detection result by the detector 5 at the display position corresponding to the position of the user's upper limb in the detection range 51 of the detector 5.

At step S51, the full-width numeral character string "080-" (character string T1) is input in the telephone number input area of the input form SC6. At step S52, the user moves the upper limb in the real space to locate the fingertip of the thumb of the right hand object RH at the head of the character string T1 "080-" and to locate the fingertip of the index finger of the right hand object RH at the tail of the character string T1 "080-". Then, the user performs a motion (first body motion) to allow the fingertip of the index finger and the fingertip of the thumb of the right hand object RH to approach each other. At step S52, in the wearable device 1, when the approaching motion is detected, the character string T1 "080-" is considered to be selected by the user. That is, the wearable device 1 executes the character selection process of selecting the character string T1.

At step S52, the wearable device 1 executes the character selection process of selecting the character string T1 and changes the character type of the selected character string T1. As illustrated at step S53, the wearable device 1 changes from the character string T1 which is full-width numeral characters to a character string T2 which is half-width numeral characters, as the change of the character type.

As described above, in the wearable device 1 according to embodiments, when the first body motion is detected, the controller 7 selects the character string T1 and executes the character type changing process of changing the character types of the characters.

The change of the character type is not limited to changing from the full-width characters to the half-width characters. FIGS. 11A to 11D are diagrams illustrating other examples of the change of a character type.

Figure 11A:
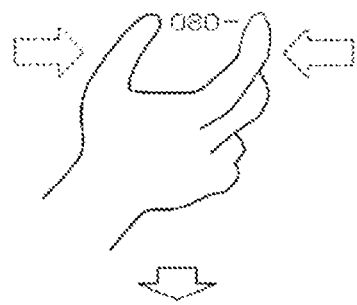
FIG. 11A is a diagram illustrating another example of change of a character type.
Figure 11A:
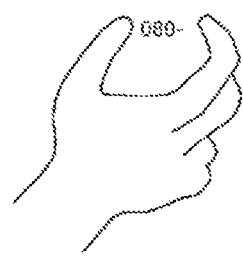

In the example illustrated in FIG. 11A, illustrated is the example where, when the first body motion of allowing the one part and the other part of the upper limb to approach each other is detected, like in the sixth example, the wearable device 1 converts the characters from full-width characters to half-width characters or changes the size of the characters. The wearable device 1 may have a configuration where, when the first body motion of allowing the one part and the other part of the upper limb to approach each other is detected, the wearable device decreases the size of the characters, and on the other hand, when the second body motion of allowing the one part and the other part of the upper limb to be separated from each other is detected, the wearable device increases the size of the characters.

Namely, the wearable device 1 according to embodiments may be characterized in that, when the body motion accompanying the change in the distance between the one part and the other part of the upper limb is detected from a detection result of the detector 5, the controller 7 executes the character type changing process of changing the character type of the characters. With such a configuration, since the wearable device 1 can change the character type of the input characters by a simpler motion such as a pinching motion, the wearable device is conveniently used by the user.

In the wearable device 1 according to embodiments, the character type changing process is a motion of changing one to the other of two predetermined types of characters. When the first body motion of allowing the distance between the one part and the other part to decrease is detected, the wearable device changes the one to the other, and on the other hand, when the second body motion of allowing the distance between the one part and the other part to increase is detected, the wearable device changes the other to the one. The two types of characters are character types having a magnitude relationship with each other. When the first body motion is detected, the wearable device 1 may change the one (full-width notation) that is relatively large to the other (half-width notation) that is relatively small out of the two character types, and when the second body motion is detected, the wearable device may change the one that is relatively small to the other that is relatively large out of the two character types. In a case where the character string to be subjected to the character type changing process includes both characters in full-width notation and characters in half-width notation, the wearable device 1 may change the characters in full-width notation to the characters in half-width notation in the character string (in a case where original characters are the characters in half-width notation, the character type is not changed) based on the first body motion, and the wearable device may change the characters in half-width notation to the characters in full-width notation in the character string (in a case where original characters are the characters in full-width notation, the character type is not changed) based on the second body motion.

Figure 11B:
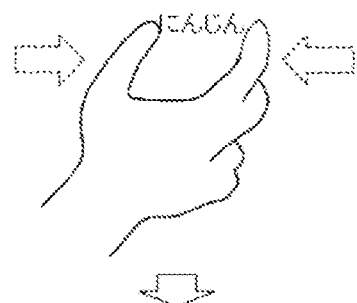
FIG. 11B is a diagram illustrating still another example of change of a character type.
Figure 11B:
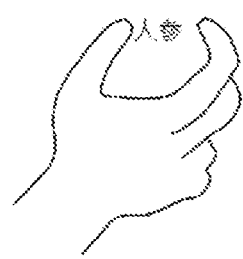

In the example illustrated in FIG. 11B, illustrated is the example where, when the first body motion of allowing the one part and the other part of the upper limb to approach each other is detected, the wearable device 1 converts the character string "にんじん" written in Kana notation to the character string "人参" written in Kanji notation. The wearable device 1 may have a configuration where, when the first body motion of allowing the one part and the other part of the upper limb to approach each other is detected, the wearable device 1 changes the characters in Kana notation to the characters in Kanji notation, and on the other hand, when the second body motion of allowing the one part and the other part of the upper limb to be separated from each other is detected, the wearable device may convert the characters in Kanji notation to characters in Kana notation. In many cases, between the character strings (words) written in Kana and the Kanji corresponding to the character string, the number of characters in the case of the Kanji notation becomes small. Therefore, since the number of characters of the character string increases or decreases according to the increase or decrease of the distance between the one part and the other part of the upper limb due to the first body motion or the second body motion, more natural operation feeling can be given to the user. That is, the wearable device 1 may have a configuration where, when the first body motion is detected, the wearable device executes an operation of changing one (Kana notation) that is relatively large to the other (Kanji notation) that is relatively small out of the two types of characters, and when the second body motion is detected, the wearable device executes an operation of changing one that is relatively small to the other that is relatively large out of the two types of characters. In a case where the character string to be subjected to the character type changing process includes both characters in Kana notation and characters in Kanji notation, the wearable device 1 may change the characters in Kana notation to the characters in Kanji notation in the character string (in a case where original characters are characters in Kanji notation, the character type is not changed) based on the first body motion, and the wearable device may change the characters in Kanji notation to the characters in Kana notation in the character string (in a case where original characters are characters in Kana notation, the character type is not changed) based on the second body motion.

Figure 11C:
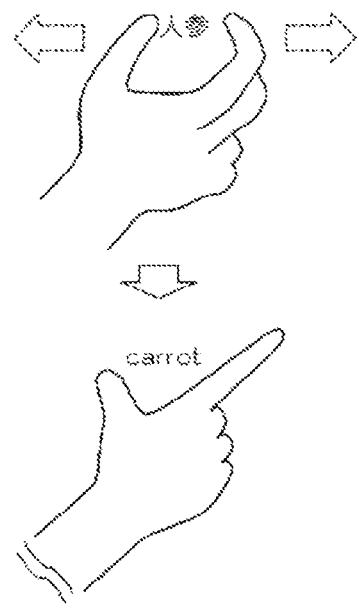
FIG. 11C is a diagram illustrating further still another example of change of a character type.

In the example illustrated in FIG. 11C, illustrated is the example where, when the first body motion of allowing the one part and the other part of the upper limb to approach each other is detected, the wearable device 1 translates a Japanese character string "人参" written in Kanji notation into an English character string "carrot". The wearable device 1 may have a configuration where, when the first body motion of allowing the one part and the other part of the upper limb to approach each other is detected, the wearable device translates Kanji notation into English notation, and on the other hand, when the second body motion of allowing the one part and the other part of the upper limb to be separated from each other is detected, the wearable device translates English notation into Kanji notation. In the example of FIG. 11C, illustrated is the example of translating one word. However, the present application is not limited thereto, but a process of translating a sentence configured with a plurality of words may be executed by the wearable device 1.

Figure 11D:
FIG. 11D is a diagram illustrating yet further still another example of change of a character type.

In the example illustrated in FIG. 11D, illustrated is the example where, with respect to the character string "Carrot" in which the first character is written in upper case character, when the first body motion of allowing the one part and the other part to approach each other is detected in the state where the one part of the upper limb is located above the "C" and the other part of the upper limb is located under the "C", the wearable device 1 changes the "C" written in upper case character to "c" written in lower case character. In contrast, with respect to the character string "carrot" in which all of the characters are written in lower case characters, when the second body motion of allowing the one part and the other part to be separated from each other is detected in the state where the one part of the upper limb is located above the "c" and the other part of the upper limb is located under the "c", the wearable device 1 changes the "c" written in lower case character to "C" written in upper case character. That is, when the first body motion is detected, the wearable device 1 may execute an operation of changing one (upper case character) that is relatively large to the other (lower case character) that is relatively small out of the two types of characters, and when the second body motion is detected, the wearable device may execute an operation of changing one (lower case character) that is relatively small to the other (upper case character) that is relatively large out of the two types of characters.

As described above with reference to FIG. 11, in the wearable device 1 according to embodiments, when the first body motion is detected, the controller 7 selects a character, and with respect to the selected character, the wearable device 1 also executes the full-width/half-width character conversion, the Kana/Kanji character conversion, the translation into another language, or the upper-case/lower-case character conversion as a character type changing process.

Heretofore, each embodiment has been described. In particular, in the first example and the second example, illustrated is the example where, when the first body motion of the user is detected, the wearable device 1 executes the character erasing process of erasing the characters selected by the character selection process. Herein, similarly to the first example and the second example, described is the configuration where, at the time of displaying the character input area SC11 on the search screen SC1 by the display unit 2, when the characters input before the time of displaying are displayed, the controller 7 may monitor the presence or absence of detection of the first body motion and may execute the character erasing process on the characters input before the time of displaying on the occasion that the first body motion is detected. According to this, the wearable device 1 may be characterized in that the wearable device includes the display unit 2 that is arranged in front of user's eyes and displays characters, the detector 5 that detects a user's upper limb existing in a real space, and a controller 7 that detects body motions of the upper limb from a detection result of the detector 5, in which, at the time of displaying a character input screen by the display unit 2, when a character string input before the time of displaying is displayed, the controller 7 determines whether or not a predetermined body motion is detected among the body motions, and if it is determined that the predetermined body motion is detected, the controller erases the display of the character string. At this time, the "predetermined body motion" is not limited to the first body motion of allowing the one part and the other part of the upper limb to approach each other as described above. For example, the "predetermined body motion" may be a clenching motion of transitioning a state where a hand is opened to a state that the hand is closed, a motion of moving a fingertip of upper limb in a predetermined direction (for example, a direction in which character strings are arranged), a motion of repeating a reciprocating motion of moving a fingertip of the upper limb in a predetermined direction and, after that, returning the fingertip of the upper limb in a direction opposite to the predetermined direction by a predetermined number of times or more within a predetermined time (a body motion emulating a motion of erasing characters with an eraser), or the like.

In the wearable device 1, at the time of displaying the character input screen by the display unit 2, when the character string input before the time of displaying is displayed, the controller 7 may determine whether or not a predetermined body motion is detected until a predetermined time elapses after the character string is displayed, and if it is determined that the predetermined body motion is detected before the predetermined time elapses, the controller may erase the display of the character string. In the wearable device 1, at the time of displaying the character input screen by the display unit 2, when the character string input before the time of displaying is displayed, the controller 7 may be allowed to erase the character string based on the fact that the first body motion (the motion of allowing the one part and the other part of the upper limb to approach each other) is performed regardless of the position of the hand object H, that is, the position of the upper limb in the real space until a predetermined time elapses after the character string is displayed, and on the other hand, after a predetermined time has elapsed since the character string was displayed, the controller may be allowed to specify the character string on condition that the hand object H is located at a predetermined position, and the controller may not be allowed to erase the character string unless the first body motion (the motion of allowing the one part and the other part of the upper limb to approach each other) is performed in the designated state.

It should be noted that those skilled in the art can easily make various modifications and alterations of embodiments described above based on the present disclosure. Therefore, it should be noted that these modifications and alterations are included in the scope of the present application. Furthermore, all technical matters disclosed in this specification can be re-arranged so as not to conflict with each other, a plurality of components can be combined into one or can be divided.

In each of embodiments described above, illustrated is the configuration where the hand object H based on the position of the upper limb in the real space and the shape of the upper limb is displayed in the display area 21, and the display mode (display position or shape) of the hand object H is changed, so that the wearable device 1 is allowed to execute the various operations exemplified above. For example, in the first example, exemplified is the configuration where the display image is selected based on the fact that the fingertip of the index finger of the hand object H is superimposed on the display image (search screen SC11). However, the present application is not limited to such a configuration. For example, the wearable device 1 may have a configuration where, in a case where it is estimated that the fingertip of the index finger of the upper limb in the real space is located at the position where it is visually recognized by the user that the fingertip of the index finger is superimposed on the display image in the display area 21, the display image is considered to be selected. In this case, the wearable device 1 estimates in advance the range of the real space that is visually recognized by the user to be superimposed on the display area 21, and thus, the wearable device can estimate which one of the positions in the display area 21 the range is visually recognized to be superimposed on, according to the fingertip of the index finger within the range and the detection position.

In the above-described embodiments, illustrated is the example where the wearable device 1 has a shape of eyeglasses, but the shape of the wearable device 1 is not limited thereto. For example, the wearable device 1 may have a helmet type shape that covers substantially the upper half of the user's head. Alternatively, the wearable device 1 may have a mask type shape that covers substantially the entire portion of the user's face.

In the above-described embodiment, it is exemplified that the wearable device 1 has a configuration where the display unit 2 has a pair of the display unit 2a and the display unit 2b arranged in front of the user's left and right eyes, but the present application is not limited thereto. For example, the display unit 2 may have a single display unit arranged in front of one of the user's left and right eyes.

In the above-described embodiment, it is exemplified that the wearable device 1 has the configuration where the edge of the front portion encloses the entire periphery of the edge of the display area of the display unit 2, but the present application is not limited thereto. For example, the wearable device 1 may have a configuration where the edge of the front portion encloses only a portion of the edge of the display area of the display unit 2.

In the above-described embodiments, illustrated is the configuration where the wearable device 1 detects a hand or a finger as a user's upper limb by the imager (or the detector). However, even in the state where the hand or the finger is gloved or the like, the hand or the finger can be detected in the same manner.

In the above-described embodiment, the configuration and operation of the wearable device 1 have been described. However, the present application is not limited thereto, and the wearable device 1 may be configured as a method or a program including each component. For example, a control method according to an aspect may be characterized in that the control method is executed by a wearable device that is attachable to a head and includes a display unit that displays characters, a detector that detects a user's upper limb existing in a real space, and a controller that detects a body motion of the upper limb from a detection result of the detector, in which the control method includes a step of detecting a first body motion of allowing one part and the other part of the upper limb to approach each other and a step of executing a character selection process of selecting the characters when the first body motion is detected as the body motion in the controller. In addition, a control program according to an aspect of the present application may be characterized in that the control program causes a wearable device that is attachable to a head and includes a display unit that displays characters, a detector that detects a user's upper limb existing in a real space, and a controller that detects a body motion of the upper limb from a detection result of the detector to execute a step of detecting a first body motion of allowing the one part and the other part of the upper limb to approach each other and a step of executing a character selection process of selecting the characters when the first body motion is detected as the body motion in the controller.

The invention claimed is:

1. A wearable device attachable to a head, the wearable device comprising:
   a display unit configured to display characters;
   a detector configured to detect a user's upper limb existing in a real space; and
   a controller configured to,
      in response to the detector detecting a single first body motion causing one part and the other part of the upper limb to approach each other,
         select a character string from the characters displayed by the display unit, the character string being defined by positions of the one part and the other part of the upper limb when the single first body motion begins, wherein the character string is editable text,
   wherein, when the first body motion is detected, and it is detected that a moving speed of the one part or the other part in the first body motion is equal to or higher than a first speed, the controller is configured to execute a character selection process of selecting the character string.

2. The wearable device according to claim 1, wherein the controller calculates an angle at which the direction in which the one part and the other part of the upper limb approach each other and an input direction of the character intersect each other, and when the angle is equal to or smaller than a first angle, the controller is configured to execute the character selection process of selecting the character string.

3. The wearable device according to claim 1, wherein the controller calculates an angle at which the direction in which the one part and the other part of the upper limb approach each other and a direction perpendicular to an input direction of the character intersect each other, and when the angle is equal to or smaller than a second angle, the controller is configured to execute the character selection process of selecting the character string.

4. The wearable device according to claim 1,
   wherein the display unit is configured to display a character string, and
   wherein, when the first body motion is detected, the controller is configured to execute the character selection process of selecting the character string on the number of the characters defined by a position of the one part and a position of the other part that are immediately before the first body motion is detected in the character string.

5. The wearable device according to claim 1,
   wherein the display unit is configured to display a character string configured with a plurality of lines, and
   wherein, when the first body motion is detected, the controller is configured to execute the character selection process of selecting the character string on the character string having the number of lines defined by a position of the one part and a position of the other part that are immediately before the first body motion is detected in the character strings.

6. The wearable device according to claim 1,
   wherein the controller is configured to execute a character type changing process of changing a character type of the characters when a body motion accompanying a change in a distance between one part and the other part of the upper limb is detected from a detection result of the detector,
   wherein the character type changing process is a process of changing one to the other of two predetermined character types,
   wherein, when the first body motion of allowing the distance between the one part and the other part of the upper limb to decrease is detected, the controller is configured to change the one to the other, and
   wherein, when a second body motion of allowing the distance between the one part and the other part of the upper limb to increase is detected, the controller is configured to change the other to the one.

7. The wearable device according to claim 6,
   wherein the two types of characters are types of characters having a predetermined magnitude relationship with each other, wherein, when the first body motion is detected, one that is relatively large is changed to the other that is relatively small out of the two types of character, and wherein, when the second body motion is detected, one that is relatively small is changed to the other that is relatively large out of the two types of character.

8. A control method executed by a wearable device that is attachable to a head and includes a display unit configured to display characters, a detector configured to detect a user's upper limb existing in a real space, and a controller, the method comprising:

in response to the detector detecting a single first body motion causing one part and the other part of the upper limb to approach each other, selecting, by the controller, a character string from the characters displayed by the display unit, the character string being defined by positions of the one part and the other part of the upper limb when the single first body motion begins, wherein the character string is editable text, wherein, the controller calculates an angle at which the direction in which the one part and the other part of the upper limb approach each other and an input direction of the character intersect each other, and when the angle is equal to or smaller than a first angle, the controller executes a character selection process of selecting the character string.

9. A non-transitory computer readable recording medium recording therein a control program executable in a wearable device that is attachable to a head and includes a display unit configured to display characters, a detector configured to detect a user's upper limb existing in a real space, and a controller, wherein, in response to the detector detecting a single first body motion causing one part and the other part of the upper limb to approach each other, the control program causes the controller to select a character string from the characters displayed by the display unit, the character string being defined by positions of the one part and the other part of the upper limb when the single first body motion begins, wherein the character string is editable text, the control program causes the controller to calculate an angle at which the direction in which the one part and the other part of the upper limb approach each other and a direction perpendicular to an input direction of the character intersect each other, and when the angle is equal to or smaller than a second angle, the control program causes the controller to execute a character selection process of selecting the character string.

* * * * *